(12) United States Patent
Okada et al.

(10) Patent No.: US 6,552,145 B1
(45) Date of Patent: Apr. 22, 2003

(54) POLARIZER PROTECTION FILM

(75) Inventors: Yasumasa Okada, Kyoto (JP); Hitoshi Kobayashi, Kyoto (JP); Shoji Nozato, Kyoto (JP); Takahiko Sawada, Kyoto (JP); Kazuaki Hiratani, Tokyo (JP); Toshihiro Otsuki, Tokyo (JP)

(73) Assignees: Sekisui Chemical Co., LTD, Osaka (JP); JSR Corporation, Tokyo (JP)

( * ) Notice: Subject to any disclaimer, the term of this patent is extended or adjusted under 35 U.S.C. 154(b) by 0 days.

(21) Appl. No.: 10/207,853

(22) Filed: Jul. 31, 2002

(30) Foreign Application Priority Data

Jul. 31, 2001 (JP) ........................................ 2001-230749

(51) Int. Cl.$^7$ ........................... C08F 32/00; C09K 19/52
(52) U.S. Cl. ...................... 526/281; 428/1.1; 428/1.31; 428/523; 359/500
(58) Field of Search ................................ 526/281, 282; 428/1.31, 1.1, 523; 359/500

(56) References Cited

U.S. PATENT DOCUMENTS

| 5,516,456 A | | 5/1996 | Shinohara et al. |
| 5,543,948 A | * | 8/1996 | Takahashi et al. ............ 359/73 |

FOREIGN PATENT DOCUMENTS

| JP | 05-212828 | 8/1993 |
| JP | 06-051117 | 2/1994 |

* cited by examiner

*Primary Examiner*—Fred Teskin
(74) *Attorney, Agent, or Firm*—Oblon, Spivak, McClelland, Maier & Neustadt, P.C.

(57) ABSTRACT

A polarizer protection film for protecting a polarizer used in a liquid crystal display is obtained by using a film obtained by melt film formation of a norbornene resin having a glass transition temperature Tg of 135° C. to 180° C., and an inherent viscosity ($\eta_{inh}$) of 0.4 or more, measured at 30° C., in chloroform, wherein the Tg and $\eta_{inh}$ are within the range indicated by the following equation (2):

$$45\eta_{inh} \leq 58.5 - 0.2 \text{Tg} \quad (2)$$

12 Claims, No Drawings

POLARIZER PROTECTION FILM

FIELD OF THE INVENTION

The present invention relates to a polarizer protection film for protecting a polarizer having a polarization function of a polarizing film used in a liquid crystal display.

BACKGROUND OF THE INVENTION

Liquid crystal displays which have recently been used for many applications, such as personal computers and word processors, exhibit a basic displaying performance by liquid crystal cells having the function of changing a plane of polarization or a phase of light by ON-OFF switching of an electric field and polarizing films having an optical shutter function varying a transmission state of light with a change in the plane of polarization or the phase.

This polarizing film is a laminated product of a polarizer having a polarization function and a protective film for securing its durability or mechanical strength with the interposition of an adhesive.

The polarization function of the polarizer is obtained by orienting a light anisotropic absorber in a transparent polymer film. There are, for example, a PVA-based polarizer obtained by allowing iodine or a dichromatic dye to be adsorbed on polyvinyl alcohol (hereinafter referred to as "PVA") film, followed by uniaxial orientation by stretching, and a polyene-based polarizer to which the polyene structure is given by dehydration or dehydrochlorination of a stretched PVA or vinyl chloride film.

In the polarizer made of such a material, a problem of deteriorated optical characteristics or dimensional shrinkage caused by disorder of orientation in reliability test of such as heat resistance is easily encountered, because PVA itself is a hydrophilic polymer as for the PVA-based film, and because the polarizer is wholly oriented by stretching, including the polyene-based film. Accordingly, the polarizer made of the above-mentioned material is provided with protective films on both surfaces thereof. These protective films are required to have high light transmittance, no birefringence, excellent heat resistance, moisture resistance, cold resistance and light resistance, and to be optically uniform, that is to say, to have no foreign matter or no streaky visual defects. Saponified solvent-cast films of tri-acetyl cellulose (hereinafter referred to as "TAC") have hitherto been used from the viewpoints of transparency, appearance and easy adhesion to the polarizers.

However, the TAC film has a moisture permeability of about 300 g/m$^2$/24 hours/100 $\mu$m, so that the ability of it to protect the polarizing film from the circumstances of high temperature and humidity such as 60° C. and 90% RH is insufficient. Further, the TAC film has the problem that a phase difference develops by a shrinkage stress of the polarizer in reliability test of the polarizing film because of its high photoelastic constant, which causes deterioration of a polarizing performance.

As means for solving this problem, it has been proposed that a norbornene resin sheet is used as a protective film for a polarizer (refer to Japanese Patent Laid-open Publication (Hei) 06-51117). The norbornene resin is lower in the moisture permeability and photoelastic constant than that of the TAC resin, so that the norbornene resin is excellent in ability to protect the polarizer under circumstances of high temperature and humidity or in the reliability test.

The norbornene resin is largely restricted by a solvent when a film thereof is formed by solvent casting. Accordingly, melt film formation is preferred, considering economy. However, its molecular skeleton contains many tertiary carbon atoms, so that it is easily deteriorated by heat or oxygen.

Usually, as means for preventing deterioration of resins due to heat or oxygen, various antioxidants such as a phenol antioxidant and a phosphate antioxidant have been used. However, in the case of the norbornene resin, it is very difficult to prevent deterioration of the resin only by addition of an additive, because of brittleness of the resin itself, and it is also difficult to prevent dot-like defects such as fish eyes or appearance defects such as die lines incident to local changes in melt viscosity.

SUMMARY OF THE INVENTION

An object of the present invention is to obtain a film having optical uniformity and being sufficient to protect a polarizer, by melt film formation of the above-mentioned norbornene resin, thereby providing a highly reliable polarizing film and a liquid crystal display using the same.

The present inventors have conducted intensive investigation on the above-mentioned problems. As a result, the inventors have discovered that the problems can be solved by using the following film for protection of the polarizer. According to the invention, there is provided a polarizer protection film obtained by melt film formation of a norbornene resin having (1) a glass transition temperature Tg (measured in accordance with JIS K 7121) of 135° C. to 180° C., and (2) an inherent viscosity ($\eta_{inh}$) of 0.4 or more, which is calculated by the following equation (1) from the drop time T (sec.) between marked lines measured at 30° C. with an Ubbelohde viscometer for a solution of the resin in chloroform having a resin concentration of C (g/dl) and the drop time B (sec.) between marked lines measured at 30° C. with an Ubbelohde viscometer for chloroform, the solvent, wherein (3) the above-mentioned Tg and $\eta_{inh}$ are within the range indicated by the following equation (2):

$$\eta_{inh} = \{\ln(T/B)\}/C \tag{1}$$

T: the drop time (sec.) between marked lines of a sample solution

B: the drop time (sec.) between marked lines of a solvent alone

C: the concentration (g/dl) of the sample solution $$45\eta_{inh} \leq 58.5 - 0.2Tg \tag{2}$$

DESCRIPTION OF THE PREFERRED EMBODIMENTS

When the glass transition temperature (Tg) of the norbornene resin used in the invention is lower than 135° C., the strength of the protective film is decreased under circumstances of a temperature as high as 90° C. or more under which the polarizing film is used, and the function sufficient for protecting the polarizer can not be exhibited. On the other hand, a norbornene resin having a Tg exceeding 180° C. brings about poor appearance such as a reduction in surface smoothness caused by gelation or non-uniform viscosity, because the molding temperature exceeds the decomposition temperature of the resin itself. The above-mentioned glass transition temperature is preferably from 140° C. to 160° C.

When the inherent viscosity ($\eta_{inh}$) of the norbornene resin used in the invention is less than 0.4, the strength is insufficient for handling as a film, resulting in the occurrence of the problem of breakage or cracks while the film runs in a production line. The above-mentioned inherent viscosity is preferably from 0.43 to 0.60.

Further, when Tg and $\eta_{inh}$ do not satisfy equation (2), poor appearance such as a reduction in surface smoothness caused by gelation or non-uniform viscosity is caused, similarly to the case that Tg exceeds 180° C.

The weight average molecular weight of the norbornene resin used in the invention is usually 45,000 or more, and preferably from 50,000 to 90,000.

The norbornene resins used in the invention include the following copolymers:

(1) A ring-opening copolymer of monomer A represented by the following general formula (I) and monomer B represented by the following general formula (II) (each of monomer A and monomer B is hereinafter also referred to as a "specific monomer");

(2) A ring-opening copolymer of monomer A represented by the following general formula (I), monomer B represented by the following general formula (II) and a copolymerizable monomer; and (3) A saturated copolymer obtained by addition copolymerization of monomer A represented by the following general formula (I), monomer B represented by the following general formula (II) and an unsaturated a polymerizable double bond-containing compound.

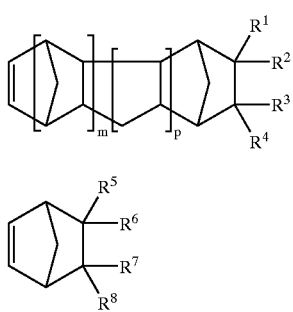

In general formulas (I) and (II), $R^1$ to $R^8$ each independently represent an atom or a group selected from the group consisting of hydrogen atom, a hydrocarbon group having 1 to 10 carbon atoms and a polar group selected from the group consisting of a halogen atom, an alkoxyl group, a hydroxyl group, an ester group (for example, an alkyl ester group), a cyano group, an amido group, an imido group and a silyl group, or a hydrocarbon group substituted by the above-mentioned polar group; $R^1$ to $R^8$ may each independently represent a group having an aromatic or heterocyclic ring; $R^1$ or $R^2$ and $R^3$ or $R^4$, or $R^5$ or $R^6$ and $R^7$ and $R^8$ may combine with each other to form a monocyclic or polycyclic structure; m is an integer of 1 to 3; and p is an integer of 0 to 3.

<Specific Monomers>

Of monomers A, preferred is a monomer represented by the above-mentioned general formula (I) in which $R^1$ and $R^3$ are each hydrogen atom or a hydrocarbon group having 1 to 10 carbon atoms, preferably 1 to 4, more preferably 1 or 2 carbon atoms, $R^2$ and $R^4$ are each hydrogen atom or a monovalent organic group, at least one of $R^2$ and $R^4$ is a polar group other than a hydrogen atom or a hydrocarbon group, m is an integer of 1 to 3, p is an integer of 0 to 3, and m+p is preferably from 1 to 4, more preferably 1 or 2, and particularly preferably 1.

The polar groups of the above-mentioned monomers A include a halogen atom, a carboxyl group, a hydroxyl group, an ester group such as an alkyl ester group or an aromatic ester group, an amino group, an amido group, a cyano group, an ether group, an acyl group, a silyl ether group and a thioether group. Of these, the carboxyl group and the ester group are preferred, and the alkyl ester group is particularly preferred.

Of monomers A, a monomer in which at least one polar group of $R^2$ and $R^4$ is represented by a formula, —$(CH_2)_n$COOR, is particularly preferred, because the resulting norbornene resin has high glass transition temperature, low moisture absorption and excellent adhesion to various materials. In the formula representing the above-mentioned specific polar group, R is a hydrocarbon group having 1 to 12 carbon atoms, preferably 1 to 4 carbon atoms, more preferably 1 or 2 carbon atoms, and preferably an alkyl group. Although n is usually from 0 to 5, lower n preferably causes in higher transition temperature of the resulting norbornene resin. Further, a specific monomer in which n is 0 is preferred in that its synthesis is easy and that the norbornene resin having high glass transition temperature is obtained.

Although monomers A can be used alone, two or more of them may be copolymerized in order to obtain a copolymer having a glass transition temperature specified in the invention.

Specific examples of the above-mentioned monomers A include tetracyclo[$4.4.0.1^{2,5}.1^{7,10}$]-3-dodecene, pentacyclo[$6.5.1.1^{3,6}.0^{2,7}.0^{9,13}$]-4-pentadecene, 8-methoxycarbonyltetracyclo[$4.4.0.1^{2,5}.1^{7,10}$]-3-dodecene, 8-ethoxycarbonyltetracyclo[$4.4.0.1^{2,5}.7,10$]-3-dodecene, 8-n-propoxycarbonyltetracyclo[$4.4.0.1^{2,5}.1^{7,10}$]-3-dodecene, 8-iso-propoxycarbonyltetracyclo[$4.4.0.1^{2,5}.1^{7,10}$]-3-dodecene, 8-n-butoxycarbonyltetracyclo[$4.4.0.1^{2,5}.1^{7,10}$]-3-dodecene, 8-phenoxycarbonyltetracyclo[$4.4.0.1^{2,5}.1^{7,10}$]-3-dodecene, 8-methyl-8-methoxycarbonyltetracyclo[$4.4.0.1^{2,5}.1^{7,10}$]-3-dodecene, 8-methyl-8-ethoxycarbonyltetracyclo[$4.4.0.1^{2,5}.1^{7,10}$]-3-dodecene, 8-methyl-8-n-propoxycarbonyltetracyclo[$4.4.0.1^{2,5}.1^{7,10}$]-3-dodecene, 8-methyl-8-iso-propoxycarbonyltetracyclo[$4.4.0.1^{2,5}.1^{7,10}$]-3-dodecene, 8-methyl-8-n-butoxycarbonyltetracyclo[$4.4.0.1^{2,5}.1^{7,10}$]-3-dodecene, 8-methyl-8-phenoxycarbonyltetracyclo[$4.4.0.1^{2,5}.1^{7,10}$]-3-dodecene, 8-ethylidenetetracyclo[$4.4.0.1^{2,5}.1^{7,10}$]-3-dodecene, 8-phenyltetracyclo[$4.4.0.1^{2,5}.1^{7,10}$]-3-dodecene and 8-methyl-8-phenyltetracyclo[$4.4.0.1^{2,5}.1^{7,10}$]-3-dodecene.

Of these, 8-methyl-8-methoxycarbonyltetracyclo[$4.4.0.1^{2,5}.1^{7,10}$]-3-dodecene is preferred as monomer A from the viewpoint of a balance between heat resistance and water absorption of a hydrogenated product of the resulting norbornene resin.

Specific examples of monomers B include but are not limited to bicyclo[2.2.1]hept-2-ene, 5-methylbicyclo[2.2.1]hept-2-ene, 5-ethylbicyclo[2.2.1]hept-2-ene, 5-methoxycarbonylbicyclo[2.2.1]hept-2-ene, 5-methyl-5-methoxycarbonylbicyclo[2.2.1]hept-2-ene, 5-phenoxycarbonylbicyclo[2.2.1]hept-2-ene, 5-methyl-5-phenoxycarbonylbicyclo[2.2.1]hept-2-ene, 5-cyanobicyclo[2.2.1]hept-2-ene, 5-ethylidenebicyclo[2.2.1]hept-2-ene, 8-ethylidenetetracyclo[$4.4.0.1^{2,5}.1^{7,10}$]-3-dodecene, 5-phenylbicyclo[2.2.1]hept-2-ene and 5-naphthylbicyclo[2.2.1]hept-2-ene (both types of α and β are available).

Of the above-mentioned specific examples of monomers B, bicyclo[2.2.1]hept-2-ene is preferred from the viewpoint of improved toughness of the resulting film.

<Copolymerizable Monomers>

Specific examples of the copolymerizable monomers include cycloolefins such as cyclobutene, cyclopentene, cycloheptene, cyclooctene and dicyclopentadiene. The carbon number of the cycloolefin is preferably from 4 to 20, and more preferably from 5 to 12. They can be used either alone or as a combination of two or more of them.

The range of monomer A and monomer B/the copolymerizable monomer used is preferably from 100/0 to 50/50, and more preferably from 100/0 to 60/40, by weight ratio.

<Ring-Opening Polymerization Catalysts>

The ring-opening polymerization reaction for obtaining (1) a ring-opening copolymer of the specific monomers and (2) a ring-opening copolymer of the specific monomers and the copolymerizable monomer is conducted in the presence of a metathesis catalyst.

This metathesis catalyst comprises (a) at least one selected from compounds of W, Mo or Re in combination with (b) at least one selected from compounds of the Ia group elements (for example, Li, Na and K), the IIa group elements (for example, Mg and Ca), the IIb group elements (for example, Zn, Cd and Hg), the IIIa group elements (for example, B and Al), the IVa group elements (for example, Si, Sn and Pb) or the IVb group elements (for example Ti and Zr) in the periodic table of Deming, each compound having at least one above-mentioned element-carbon bond or above-mentioned element-hydrogen bond. In this case, in order to enhance activity of the catalyst, (c) an additive described later may be added.

Typical examples of the compounds of W, Mo or Re suitable for component (a) include compounds, such as $WCl_6$, $MoCl_6$ and $ReOCl_3$, described in Japanese Patent Laid-open Publication (Hei) 1-132626, page 8, from upper left column, line 6 to upper right column, line 17.

Specific examples of components (b) include compounds, such as n-$C_4H_9Li$, $(C_2H_5)_3Al$, $(C_2H_5)_2AlCl$, $(C_2H_5)_{1.5}AlCl_{1.5}$, $(C_2H_5)AlCl_2$, methylalmoxane and LiH, described in Japanese Patent Laid-open Publication (Hei) 1-132626, page 8, from upper right column, line 18 to lower right column, line 3.

Although typical examples of components (c), the additives, which can be suitably used, include alcohols, aldehydes, ketones and amines, compounds described in Japanese Patent Laid-open Publication (Hei) 1-132626, from lower right column, line 16 of page 8 to upper left column, line 17 of page 9 can be further used.

The metathesis catalyst is used in such an amount as to give a molar ratio of the above-mentioned component (a) to the specific monomers (component (a):specific monomers) of usually 1:500 to 1:100,000, and preferably 1:1,000 to 1:50,000.

The ratio of component (a) to component (b) ((a):(b)) is from 1:1 to 1:50, and preferably from 1:2 to 1:30, by metal atom ratio.

The ratio of component (a) to component (c) ((a):(c)) is from 0.005:1 to 15:1, and preferably from 0.05:1 to 7:1, by molar ratio.

<Solvents for Polymerization Reaction>

Solvents used in the ring-opening polymerization reaction (solvents constituting molecular weight modifier solutions, solvents for the specific monomers and/or metathesis catalysts) include, for example, alkanes such as pentane, hexane, heptane, octane, nonane and decane, cycloalkanes such as cyclohexane, cycloheptane, cyclooctane, decalin and norbornane, aromatic hydrocarbons such as benzene, toluene, xylene, ethylbenzene and cumene, alkane halide or aryl halide compounds such as chlorobutane, bromohexane, methylene chloride, dichloroethane, hexamethylene dibromide, chlorobenzene, chloroform and tetrachloroethylene, saturated carboxylic esters such as ethyl acetate, n-butyl acetate, iso-butyl acetate and methyl propionate, and ethers such as dibutyl ether, tetrahydrofuran and dimethoxyethane. They can be used either alone or as a mixture of them. Of these, the aromatic hydrocarbons are preferred.

The solvent is used in such an amount as to give "a solvent:specific monomers ratio (weight ratio)" of usually 1:1 to 10:1, preferably from 1:1 to 5:1.

<Molecular Weight Modifiers>

Although the molecular weight of the ring-opening copolymer can be controlled by polymerization temperature, the kind of catalyst and the kind of solvent, it is controlled by allowing a molecular weight modifier to coexist in a reaction system.

Preferred examples of the molecular weight modifiers include, for example, α-olefins such as ethylene, propene, 1-butene, 1-pentene, 1-hexene, 1-heptene, 1-octene, 1-nonene and 1-decene. Of these, 1-butene and 1-hexene are particularly preferred.

These molecular weight modifiers can be used either alone or as a mixture of two or more of them.

The amount of the molecular weight modifier used is from 0.005 to 0.6 mole, and preferably from 0.02 to 0.5 mole, per mole of specific monomer used in the ring-opening polymerization reaction.

In order to obtain the ring-opening copolymer of (1) or (2), the specific monomers and the copolymerizable monomer may be polymerized by ring opening in a ring-opening polymerization stage. However, the specific monomers may be polymerized by ring opening in the presence of an unsaturated hydrocarbon polymer having two or more carbon-carbon double bonds on its main chain such as polybutadiene, polyisoprene, a styrene-butadiene copolymer, an ethylene-non-conjugated diene copolymer or polynorbornene.

Although the ring-opening copolymer obtained as described above can be used as such, a hydrogenated copolymer obtained by hydrogenation is useful because of its excellent heat stability.

<Catalysts for Hydrogenation>

The hydrogenation reaction is conducted by an ordinary method, that is to say, by adding a catalyst for hydrogenation to a solution of the ring-opening copolymer, and allowing hydrogen gas of ordinary pressure to 300 atm., preferably 3 to 200 atm. to act thereon at 0° C. to 200° C., preferably 20° C. to 180° C.

As the hydrogenation catalyst, there can be used one employed in the hydrogenation reaction of ordinary olefinic compounds. The hydrogenation catalysts include heterogeneous catalysts and homogeneous catalysts.

The heterogeneous catalysts include solid catalysts in which noble metal catalytic materials such as palladium, platinum, nickel, rhodium and ruthenium are carried on carriers such as carbon, silica, alumina and titania. The catalysts may be either in a powdery form or in a granular form.

The homogeneous catalysts include nickel naphthenate/triethylaluminum, nickel acetylacetonato/triethylaluminum, cobalt octenoate/n-butyllithium, titanocene dichloride/diethylaluminum monochloride, rhodium acetate, chlorotris (triphenylphosphine)rhodium, dichlorotris (triphenylphosphine)ruthenium, chlorohydrocarbonyltris (triphenyl-phosphine)ruthenium and dichlorocarbonyltris (triphenyl-phosphine)ruthenium.

These hydrogenation catalysts are used in such an amount as to give a ring-opening copolymer:hydrogenation catalyst ratio (weight ratio) of 1:1×10$^{-6}$ to 1:2.

As described above, the hydrogenated copolymers obtained by hydrogenation have excellent heat stability, and their characteristics are not deteriorated even by heating at the time when they are molded, or when they are used as products. The hydrogenation rate of double bonds of a main chain of the ring-opening polymer is usually 50% or more, preferably 90% or more, and more preferably 98% or more. The above-mentioned hydrogenation rate can be measured at 60 MHz by $^1$H-NMR.

Further, as the norbornene resin of the invention, there can also be used (3) the saturated copolymer of the above-mentioned specific monomers and the unsaturated polymerizable double bond-containing compound.

<Unsaturated Polymerizable Double Bond-Containing Compounds>

The unsaturated polymerizable double bond-containing compounds include an olefinic compound having preferably 2 to 12 carbon atoms, more preferably 2 to 8 carbon atoms, such as ethylene, propylene or butene.

The specific monomers/unsaturated polymerizable double bond-containing compound ratio is preferably from 90/10 to 40/60, and more preferably from 85/15 to 50/50, by weight ratio.

In the invention, ordinary addition polymerization can be used for obtaining (3) the saturated copolymer of the specific monomers and the unsaturated polymerizable double bond-containing compound.

<Addition Polymerization Catalysts>

As a catalyst for synthesizing the above-mentioned saturated copolymer (3), there can be used at least one compound selected from a titanium compound, a zirconium compound and a vanadium compound, and an organic aluminum compound as a promoter.

The titanium compounds used herein include titanium tetrachloride and titanium trichloride, and the zirconium compounds include bis(cyclopentadienyl)zirconium chloride and bis(cyclopentadienyl)zirconium dichloride.

As the vanadium compounds, there are used compounds represented by the following general formula or electron-donor thereof:

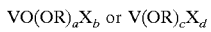

$VO(OR)_aX_b$ or $V(OR)_cX_d$

Wherein R is a hydrocarbon group, X is a halogen atom, $0 \leq a \leq 3$, $0 \leq b \leq 3$, $2 \leq (a+b) \leq 3$, $0 \leq c \leq 4$, $0 \leq d \leq 4$ and $3 \leq (c+d) \leq 4$.

The above-mentioned electron donors include oxygen-containing electron donors such as an alcohol, a phenol, a ketone, an aldehyde, a carboxylic acid, an ester of an organic or inorganic acid, an ether, an acid amide, an acid anhydride and an alkoxysilane, and nitrogen-containing electron donors such as ammonia, an amine, a nitrile and an isocyanate.

Further, as the organic aluminum compound used as a promoter, there is used at least one selected from compounds each having at least one aluminum-carbon bond or aluminum-hydrogen bond.

In the above, for example, when the vanadium compound is used, as for the ratio of the organic aluminum compound to the vanadium compound, the ratio of aluminum atoms to vanadium atoms (Al/V) is 2 or more, preferably from 2 to 50, and particularly preferably from 3 to 20.

As solvents for the polymerization reaction used in addition polymerization, the same solvents as used in the ring-opening reaction can be used. The molecular weight of the resulting saturated copolymer (3) is controlled usually by use of hydrogen.

Thus obtained copolymer inevitably contains enormous amount of carbon-carbon double bonds in its structure, so a hydrogenated copolymer is preferable in respect of heat stability.

The amount of gels contained in the norbornene resin of the invention is preferably as small as possible. When the amount of gels is large, the occurrence of fish eye-like defects or die lines is observed in a film obtained by melt film formation in some cases. The amount of gels contained in a gram of the resin is preferably 30 gels or less, more preferably 20 gels or less, and particularly preferably 10 gels or less. Here, the amount of gels contained in a gram of the resin is measured as described below.

<Measurement of Gel Content>

Pellets accurately weighed are dissolved in THF to obtain a THF solution having a concentration of around 5% by weight, and the resulting solution is filtered by suction through a 0.5-μm membrane filter. The membrane filter after filtration is heated in a muffle furnace at 260° C. for about 30 minutes. Gels (having a size of about 10 μm or more, blurred in their contours and observed brown) on the membrane filter are observed under a stereoscopic microscope of 20 magnifications to count the number of the gels.

There is no particular limitation on the polarizer which can be used in the invention, as long as it has a function as a polarizer. Examples thereof include the above-mentioned PVA-based or polyene-based polarizer. There is no particular limitation also on the method for producing the polarizer. For example, in the case of the PVA-based polarizer, methods for producing the same include a method of allowing iodine to be adsorbed on PVA film, followed by uniaxial stretching of the film, a method of uniaxially stretching a PVA film, followed by adsorption of iodine on the film, a method of concurrently performing adsorption of iodine on a PVA film and uniaxial stretching of the film, a method of dying a PVA film with a dichromatic dye, followed by uniaxial stretching of the film, a method of uniaxially stretching a PVA film, followed by dying of the film with a dichromatic dye and a method of concurrently performing dying a PVA film with a dichromatic dye and uniaxial stretching of the film. In the case of the polyene-based polarizer, methods for producing the same include known methods such as a method of uniaxially stretching a PVA film, followed by heating and dehydration in the presence of a dehydration catalyst, and a method of uniaxially stretching a polyvinyl chloride film, followed by heating and dehydration in the presence of a dehydrochlorination catalyst.

In the invention, known antioxidants and ultraviolet absorbers can be added in melt film formation, in order to prevent deterioration of the film, and to improve reliability after formation of polarizing plate. The antioxidants include, for example, 2,6-di-t-butyl-4-methylphenol, 2,2'-dioxy-3,3'-di-t-butyl-5,5'-dimethyldiphenylmethane, tetrakis[methylene-3-(3',5'-di-t-butyl-4'-hydroxyphenyl)propionate]methane, 1,1,3-tris(2-methyl-4-hydroxy-5-t-butylphenyl)butane, 1,3,5-trimethyl-2,4,6-tris(3,5-di-t-butyl-4-hydroxybenzyl)benzene, stearyl-β-(3,5-di-t-butyl-4-hydroxyphenyl)propionate, 2,2'-dioxy-3,3'-di-t-butyl-5,5'-diethylphenylmethane, 3,9-bis[1,1-dimethyl-2-{β-(3-t-butyl-4-hydroxy-5-ethylphenyl)propionyloxy}ethyl]-2,4,8,10-tetraoxaspiro[5,5]undecane, tris(2,4-di-t-butylphenyl)phosphite, cyclic neopentanetetraylbis(2,6-di-t-butyl-4-methylphenyl]phosphite and 2,2-methylenebis(4,6-di-t-butylphenyl)octyl phosphite. The ultraviolet absorbers include, for example, 2-(2'-hydroxy-5'-methylphenyl)

benzotriazole, 2-(2'-hydroxy-3'-t-butyl-5'-methylphenyl)-5-chlorobenzotriazole, 2-(2'-hydroxy-3',5'-di-t-butylphenyl)-5-chlorobenzotriazole, 2-[2'-hydroxy-3'-(3",4",5",6"-tetrahydrophthalimidomethyl)-5'-methylphenyl]benzotriazole, 2,2'-methylenebis(4-(1,1,3,3-tetramethylbutyl)-6-[(2H-benzotriazole-2-yl)phenol]), 2-(2H-benzotriazole-2-yl)-4,6-bis(1-methyl-1-phenylethyl)phenol, 2,4-dihydroxybenzophenone and 2,2'-dihydroxy-4,4'-methoxybenzophenone. Further, in order to improve processability, lubricants can also be added.

It is preferred that these additives have high weight decreasing temperature and low vapor pressure. Low weight decreasing temperature results in decomposition of the additives in melt film formation to exert an adverse effect on surface properties of the resulting film in some cases. Further, high vapor pressure exerts an adverse effect on surface properties of the resulting film, due to evaporation of the additives, in some cases. Accordingly, of the additives used, at least the antioxidant and the ultraviolet absorber have preferably a 5% weight decreasing temperature of 300° C. or more and a vapor pressure at ordinary temperature and pressure of $1 \times 10^{-9}$ Pa or less, and more preferably a 5% weight decreasing temperature of 330° C. or more and a vapor pressure at ordinary temperature and pressure of $3 \times 10^{-9}$ Pa or less.

Of these, 1,3,5-trimethyl-2,4,6-tris(3,5-di-t-butyl-4-hydroxybenzyl)benzene and tetrakis[methylene-3-(3,5-di-tbutyl-4-hydroxyphenyl)propionate]methane are preferably used as the antioxidants, and 2,2'-methylenebis(4-(1,1,3,3-tetramethylbutyl)-6-[(2H-benzotriazole-2-yl)phenol]) and 2-(2H-benzotriazole-2-yl)-4,6-bis(1-methyl-1-phenylethyl)phenol are preferably used as the ultraviolet absorbers.

These antioxidants and ultraviolet absorbers may be used either alone or as a combination of two or more of them, and the antioxidants may be used in combination with the ultraviolet absorbers.

These antioxidants and ultraviolet absorbers are added usually in an amount of 0.1 to 5 parts by weight, preferably in an amount of 0.2 to 3 parts by weight, based on 100 parts by weight of the norbornene resin. When the amount added is too small, no effect of improving durability is obtained. On the other hand, when it is too large, the appearance or optical characteristics of the resulting film are deteriorated by bleedout to surfaces thereof.

The thickness of the polarizer protection film of the invention is usually from 10 to 100 µm, and preferably from 20 to 80 µm. When the thickness is too thin, tensile strength or tear strength is insufficient, resulting in failure to obtain the protective function of the polarizer. On the other hand, when it is too thick, the problem arises that cost rises by reduced processability in lamination or in cutting for forming the polarizer protection film, or by a reduction in productivity.

In melt film formation for forming the polarizer protection film of the invention, a single-screw extruder, a double-screw extruder or a planetary multi-screw extruder is usually used. In that case, in order to remove low molecular weight volatile components such as water, gas, residual solvents, melt volatile components and decomposed products, it is preferred that a drying process is provided before the resin is supplied to the extruder, or that the extruder is equipped with vent means. The resin melted in the extruder can be extruded from a die for extruding the resin into a melt sheet, such as a T-die or a hanger coat die, and solidified by adhering the sheet to a cooling drum, thereby obtaining the desired film. Adhering methods include a nip roll system, an electrostatic application system, an air knife system, a vacuum chamber system and a calender system. As for the cooling drum for solidifying the melt sheet, a surface thereof made of steel, nitriding steel or stainless steel is preferably chrome-plated or treated with tungsten carbide for controlling its releasability. It is desirable that the surface thereof has an Rmax of 0.2 µm or less for maintaining the smoothness of the film.

The polarizer protection film of the invention is used as a polarizing film for a liquid crystal display by laminating the protection film with the above-mentioned polarizer on at least one surface thereof.

As for laminating of a protection film on a polarizer, for example, a protection film and a polarizer can be adhered by use of a transparent adhesive or a pressure-sensitive adhesive. There is no particular limitation on the laminating method, the kind of agent and the kind of pressure-sensitive adhesive.

For example of the laminating method, there can be mentioned, a laminating method (1) of adhering a protection film and a polarizer directly with each other by an adhesive or a pressure-sensitive adhesive and a laminating method (2) of providing a primer layer on the surface of a protection film and then adhering a polarizer thereon by an adhesive or a pressure-sensitive adhesive. In method (2), the above primer layer means under-coating layer provided in order to enhance the adhering intensity between a protection film and an adhesive or a pressure-sensitive adhesive. In order to provide a primer layer, polyurethane or polyethyleneimine and the like can be under-coated on a protection film.

In each above laminating method of (1) or (2), surface treatment such as corona treatment of a protection film is preferably conducted previously. It is preferable that after surface treatment, the contact angle of distilled water on the surface of a protection film is not more than 64°, more preferably not more than 60°, particularly preferably not more than 55°.

The above adhesive and pressure-sensitive adhesive include both of organic solvent type and water type, and it can be employed both of dry lamination process and wet lamination process.

As for adhesives, examples include PVA type adhesive, urethane type adhesive, acrylic type adhesive, aqueous vinyl urethane type adhesive and the like can be mentioned. Among them, urethane type adhesive is preferred because of its high adhering intensity and excellent durability.

As for pressure-sensitive adhesive used for laminating a protection film on a polarizer, examples include a natural rubber adhesive, a synthetic rubber adhesive, a vinyl acetate/vinyl chloride copolymer adhesive, a polyvinyl ether adhesive, an acrylic adhesive, a modified polyolefin adhesive and a silicone adhesive.

As for coating method of an adhesive or a pressure-sensitive adhesive on a polarizer, the coating solution is prepared at an adequate concentration (such as 0.01 to 50% by weight) by diluting an adhesive or a pressure-sensitive adhesive with water or organic solvent, depending on the dry thickness, workability of coating and the like. The above prepared solution can be coated and dried on a polarizer by means of known devices such as gravure coater, micro gravure coater.

The thickness of the dried adhesive layer or pressure-sensitive adhesive layer is preferably from 0.001 to 30 µm, and more preferably from 0.01 to 25 µm.

Further, this polarizing film for a liquid crystal display can be laminated, for example, in the order of a retardation film and a liquid crystal cell (transparent electrode substrate), with the interposition of a pressure-sensitive adhesive, thereby constituting a liquid crystal display.

The pressure-sensitive adhesive is preferably one excellent in transparency. Although there is no particular limitation thereon, examples thereof include a natural rubber adhesive, a synthetic rubber adhesive, a vinyl acetate/vinyl chloride copolymer adhesive, a polyvinyl ether adhesive, an acrylic adhesive, a modified polyolefin adhesive and a silicone adhesive. Of these, the acrylic adhesive is preferably used in terms of heat resistance and cost.

The thickness of the pressure-sensitive adhesive is preferably from 5 to 100 μm, and more preferably from 10 to 50 μm. Less than 5 μm results in easy separation of the film in making a durability test, whereas exceeding 100 μm results in too high peel force, which causes a possibility of breakage of a liquid crystal cell in carrying out a rework operation thereof.

According to the invention, the norbornene resin film having very few appearance defects can be obtained by melt film formation in which intact resin quality is maintained. The use of this film can provide the polarizing film and the liquid crystal display exhibiting the maximum performance of the norbornene resin and having high reliability.

The invention will be illustrated with reference to examples in more detail below, but the following examples are not intended to limit the scope of the invention. Parts and percentages in the examples and comparative examples are on a weight basis, unless otherwise specified. Various measurements in the examples and comparative examples were made as follows:

Inherent Viscosity ($\eta_{inh}$)

Using chloroform as a solvent, the viscosity was measured at a concentration of 0.5 g/dl at 30° C. with an Ubbelohde viscometer.

Glass Transition Temperature (Tg)

In accordance with JIS K 7121, the glass transition temperature was measured at a rate of temperature increase of 10° C./minute in an atmosphere of nitrogen with a differential scanning calorimeter (DSC).

Evaluation Methods of Film (1) Evaluation of Deterioration

For evaluating that deterioration did not occur during the process of melt film formation of a film, the ratio of the polystyrene-converted weight average molecular weight $Mw_1$ after melt film formation to the weight average molecular weight $Mw_0$ of a intact material resin before melt film formation ($Mw_1/Mw_0$) was used. the case that $Mw_1/Mw_0$ was 0.9 or more was indicated by ○, and the case that it was less than 0.9 was indicated by X.

The weight average molecular weight was measured in the following manner, and the converted value according to standard polystyrene was used.

Twenty milligrams of a sample was weighed into a flask, and 5 ml of tetrahydrofuran was added thereto, followed by standing for 24 hours. Then, a dissolved component was filtered through a 0.2-μm filter, and gel permeation chromatography was carried out under the following measuring conditions:

Apparatus: high performance liquid chromatograph (manufactured by Hitachi, Ltd.)

Pump: L-6000

Detector: L-3300RI

Column: HSG60+HSG30+HSG20 (manufactured by SEKISUI FINE CHEMICAL CO., LTD.)

Carrier: tetrahydrofuran (1.0 ml/minute)

Temperature: room temperature

Amount injected: 100 μl

Calibration: a standard polystyrene sample, trade name "Showdex" manufactured by SHOWA DENKO K. K.

(2) Appearance

A central portion of a film was visually observed. The case that streaky poor appearance in an extrusion direction was observed was evaluated as X, and the case that the poor appearance was not observed was evaluated as ○.

(3) Surface Roughness

In accordance with JIS B 0601, the center line average height (Ra) and the maximum height (Rmax) were measured in a width direction of a central portion of a film under the following conditions:

Measuring equipment (Surface roughness tester): "Perthometer C5D" (trade name) manufactured by MAHR GmbH (Germany)

Tracer: RFHTB 50 μm

Analyzer: sas-2010

Analyzing conditions: measuring length: 3 mm, cutoff: 0.8 mm (4) Performance of Polarizing Film Preparation of Polarizer A 75-μm thick PVA film was immersed in water, and then, uniaxially stretched 5 times in the machine direction. The resulting film was immersed in an aqueous solution containing 0.5% of iodine and 5% of potassium iodide while keeping the strained state of the film to allow the dichromatic dye to be adsorbed. Further, the film was subjected to crosslinking treatment while keeping the strain in an aqueous solution containing 10% of boric acid and 10% of potassium iodide at 50° C. to obtain a polarizer.

Preparation of Polarizing Film

Using an aqueous urethane adhesive, a polarizer was wet laminated with norbornene resin films on both surfaces thereof through a pair of rubber rolls, and dried at 50° C. for 3 minutes, at 70° C. for 3 minutes and at 80° C. for 3 minutes. Then, the resulting product was cured at 45° C. for 48 hours to obtain a polarizing film. As the adhesive, there was used a composition in which 30 parts of a hardening agent and 520 parts of ion-exchanged water were compounded to 100 parts of the aqueous urethane base resin (trade name: EL-436A/B, manufactured by Toyo-Morton Ltd.). Corona treatment was applied to adhesive surfaces of the norbornene resin films as pretreatment. The contact angle of the corona-treated surface with distilled water was 43° (based on ASTM D5946-96).

Preparation of Acrylic Adhesive and Non-Support Tape

Toluene was added to a solution of an acrylic polymer in ethyl acetate to dilute it, thereby preparing a 13% solution of the acrylic polymer in toluene, the acrylic polymer being composed of 94.8 parts of butyl acrylate, 5 parts of acrylic acid and 0.2 part of 2-hydroxyethyl methacrylate, and having a weight average molecular weight (Mw) of 1,200,000 and a weight average molecular weight (Mw)/number average molecular weight (Mn) ratio (Mw/Mn) of 3.9. A solution which was obtained by adding 2.0 parts of an isocyanate crosslinking agent (Coronate L (manufactured by Nippon Polyurethane Industry Co., Ltd.)) and stirring the resulting mixture was applied onto a release film, and dried in two steps, at 60° C. for 5 minutes and at 100° C. for 5 minutes, so as not to foam. Then, prepared was an easy release film able to be released easier than the release film on which the above solution is applied. The easy release film was laminated on the adhesive surface in order to cover the adhesive temporarily, thereby preparing a non-support tape having an adhesive thickness (average value) after drying of 25 μm.

Preparation of Test Piece for Evaluation and Durability Test

Corona treatment was applied to one surface of the norbornene resin film of the polarizing film thus prepared. The non-support tape with an adhesive thickness of 25 μm prepared above, from which the easy release film was peeled off, was laminated on the corona-treated surface to prepare a polarizing film adhesive sheet.

The polarizing film adhesive sheet was punched with a Thomson punching machine into a rectangular test piece having 12.1 in. between vertically opposite angles so that an absorption axis of the polarizer made an angle of 45° with a side. Further, the release film left on the polarizing film adhesive sheet was peeled off, and an adhesive surface thereof was adhered to a 1.2-mm thick non-alkali glass plate with a bench laminator. Each of the polarizing films was adhered to both surfaces of the glass plate so that the absorption axes of two polarizers cross each other orthogonally. After allowed to stand at room temperature for 1 hour, the glass plate was treated in an autoclave at 0.5 MPa for 20 minutes. After completion of the autoclave treatment, the glass plate was allowed to stand at room temperature for 1 hour, and subjected to the durability test (allowed to stand at 80° C. at a dry state for 250 hours, or at 60° C. at 90% RH for 250 hours).

The optical durability characteristics before and after the durability test were evaluated by changes in light transmittance. The light transmittance was determined by measuring the parallel light transmittance with a spectrophotometer (manufactured by OTSUKA ELECTRONICS CO., LTD, RETS-2000) using a C light source by CIE 1931 standard calorimetric system. The light transmittance of a rectangular test piece was measured at 4 positions, in the middle points of the four respective sides of the test piece and 10 mm away from the side edges thereof, and the average value of measurements at the four positions was determined.

Reference Example 1

95 g of 8-methyl-8-methoxycarbonyltetracyclo[4.4.0.1$^{2,5}$.1$^{7,10}$]dodec-3-ene, 5 g of 5-ethyl-bicyclo[2.2.1]hept-2-ene, 60 g of 1,2-dimethoxyethane, 240 g of cyclohexane, 10 g of 1-hexene and 3.4 ml of a 0.96 mole/liter solution of diethylaluminum chloride in toluene were introduced into an autoclave having an internal volume of 1 liter.

On the other hand, 20 ml of a 0.05 mole/liter solution of tungsten hexachloride in 1,2-dimethoxyethane and 10 ml of a 0.1 mole/liter solution of para-aldehyde in 1,2-dimethoxyethane were mixed in another flask. This mixed solution (4.9 ml) was added to the mixture in the above-mentioned autoclave. After sealing, the mixture was heated at 80° C., followed by stirring for 3 hours.

A 2/8 (weight ratio) mixed solvent of 1,2-dimethoxyethane and cyclohexane was added to the resulting polymer solution to give a polymer/solvent ratio of 1/10 (weight ratio), and then, 20 g of triethanolamine was added thereto, followed by stirring for 10 minutes.

To this polymer solution, 500 g of methanol was added, and the resulting solution was stirred for 30 minutes and allowed to stand. An upper layer of two layers separated was removed, and methanol was added again. After stirring and standing, an upper layer was further removed.

The same operation was further repeated twice, and the resulting lower layer was appropriately diluted with 1,2-dimethoxyethane/cyclohexane mixed solvent to obtain a 1,2-dimethoxyethane/cyclohexane mixed solution having a polymer concentration of 10%.

To this solution, 20 g of palladium/silica-magnesia (manufactured by Nikki Chemical Co., Ltd., palladium content=5%) was added, and the reaction was conducted in an autoclave at a hydrogen pressure of 40 kg/cm$^2$ at 165° C. for 4 hours. Then, the hydrogenation catalyst was removed by filtration to obtain a hydrogenated copolymer solution.

Pentaerythritol-tetrakis[3-(3,5-di-t-butyl-4-hydroxyphenyl)propionate], an antioxidant, was added to this hydrogenated copolymer solution in an amount of 0.1% based on the hydrogenated copolymer, followed by desolvation at 380° C. under reduced pressure.

Then, the copolymer was melted and pelletized with an extruder in an atmosphere of nitrogen to obtain thermoplastic resin A. The glass transition temperature of this copolymer was 150° C., $\eta_{inh}$, and the hydrogenation rate was substantially 100%.

Reference Example 2

Polymerization, hydrogenation and palletizing were carried out in the same manner as with Reference Example 1 with the exception that 90 g of 8-methyl-8-methoxycarbonyltetracyclo[4.4.0.1$^{2,5}$.1$^{7,10}$]dodec-3-ene, 10 g of bicyclo[2.2.1]hept-2-ene and 5 g of 1-hexene were used, thereby obtaining thermoplastic resin B. The glass transition temperature of this polymer was 140° C., $\eta_{inh}$ was 0.62, and the hydrogenation rate was substantially 100%.

EXAMPLE 1

Thermoplastic resin A prepared in Reference Example 1 was dried with a dryer equipped with a dehumidifier at a drying temperature of 100° C. for 4 hours, and then, extruded to a film having a width of 455 mm and a thickness of 50 µm, according to the following melt film formation conditions:

Extruder: inner diameter: 50 mm, L/D: 28, extrusion temperature: 230 to 3000° C.

Filter: leaf disk type filter, filtration precision: 3 µm, filtration area: 0.8 m$^2$ Extrusion die: width: 500 mm, coat hanger type Extrusion amount: 20 kg/hour Take-up unit: cooling roll temperature: 80° C. to 145° C., take-up speed: 14 m/minutes Then, for the resulting film, (1) the evaluation of deterioration, (2) the appearance and (3) the performance of the polarizing film were evaluated as described above. Results thereof are shown in Table 1.

EXAMPLE 2

An extruded film was obtained and evaluated in the same manner as with Example 1 with the exception that resin B prepared in Reference Example 2 was used, and the extrusion temperature was changed to 270 to 320° C., because of its different extrusion suitability. Results thereof are shown in Table 1.

Comparative Example 1

An extruded film was obtained and evaluated in the same manner as with Example 1 with the exception that a commercially available norbornene resin (trade name: "G6810", manufactured by JSR Corporation, glass transition temperature: 172° C., $\eta_{inh}$:0.63) was used, and the extrusion temperature was changed to 270 to 320° C., because of its different extrusion suitability.

The resulting film was poor in appearance, so that evaluations as the polarizing film were not conducted. Results thereof are shown in Table 1.

Comparative Example 2

Using a commercially available 80-µm TAC film (trade name: "FUJITAC CLEAR", manufactured by FUJI PHOTO FILM CO., LTD.), a polarizing film was prepared in the following manner.

A 5% aqueous solution of commercially available PVA (product number: "PVA-117", manufactured by KURARAY CO., LTD.) was prepared. This solution was applied onto the TAC film, and a polarizer was wet laminated with the TAC film while stripping off excess aqueous solution with a pair of rolls. The resulting film was dried with hot air stepwise, at 50° C. for 3 minutes, at 70° C. for 3 minutes and at 80° C. for 3 minutes, to prepare a polarizing film. Results thereof are shown in Table 1.

TABLE 1

|  | Example 1 | Example 2 | Comparative Example 1 | Comparative Example 2 |
|---|---|---|---|---|
| Properties of Resin |  |  |  |  |
| $\eta_{inh}$ | 0.46 | 0.62 | 0.63 | — |
| Tg | 150 | 140 | 172 | — |
| 45 $\eta_{inh}$ | 20.7 | 27.9 | 28.4 | — |
| 58.5–0.2 Tg | 28.5 | 30.5 | 24.1 | — |
| Evaluation of Film |  |  |  |  |
| Film Appearance | ◯ | ◯ | X | — |
| Evaluation of Deterioration |  |  |  |  |
| $Mw_0$ (×10$^5$) | 7.2 | 9.0 | 10.2 | — |
| $Mw_1$ (×10$^5$) | 7.2 | 9.0 | 8.6 | — |
| Evaluation | ◯ | ◯ | X | — |
| Surface Roughness |  |  |  |  |
| Ra (μm) | 0.038 | 0.041 | 0.128 | — |
| Rmax (μm) | 0.294 | 0.31 | 1.07 | — |
| Optical Durability Characteristics of Polarizing Film Changes in Transmittance (Δ%) |  |  |  |  |
| Heat Resistance (60° C. dry × 250 hr.) | 0.02 | 0.02 | — | 1.30 |
| Moisture Resistance (60° C. 90% RH × 250 hr.) | 0.01 | 0.01 | — | 1.07 |

What is claimed is:

1. A polarizer protection film obtained by melt film formation of a norbornene resin having (1) a glass transition temperature Tg (measured in accordance with JIS K 7121) of 135° C. to 180° C., and (2) an inherent viscosity ($\eta_{inh}$) of 0.4 or more, which is calculated by the following equation (1) from the drop time T (sec.) between marked lines measured at 30° C. with an Ubbelohde viscometer for a solution of the resin in chloroform having a resin concentration of C (g/dl) and the drop time B (sec.) between marked lines measured at 30° C. with an Ubbelohde viscometer for chloroform, the solvent, wherein (3) the above-mentioned Tg and $\eta_{inh}$ are within the range indicated by the following equation (2):

$$\eta_{inh} = \{\ln(T/B)\}/C \quad (1)$$

T: the drop time (sec.) between marked lines of a sample solution
B: the drop time (sec.) between marked lines of a solvent alone
C: the concentration (g/dl) of the sample solution $$45\eta_{inh} \leq 58.5 - 0.2Tg \quad (2).$$

2. The polarizer protection film according to claim 1, wherein the norbornene resin is obtained by copolymerizing monomers indispensably containing at least one monomer A represented by the following general formula (I) and at least one monomer B represented by the following general formula (II):

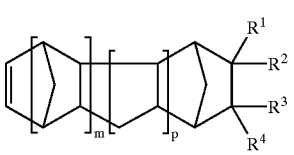

(I)

(II)

wherein $R^1$ to $R^8$ each independently represent an atom or a group selected from the group consisting of hydrogen atom, a hydrocarbon group having 1 to 10 carbon atoms and a polar group selected from the group consisting of a halogen atom, an alkoxyl group, a hydroxyl group, an ester group, a cyano group, an amido group, an imido group and a silyl group, or a hydrocarbon group substituted by the polar group; $R^1$ to $R^8$ may each independently represent a group having an aromatic or heterocyclic ring; $R^1$ or $R^2$ and $R^3$ or $R^4$, or $R^5$ or $R^6$ and $R^7$ and $R^8$ may combine with each other to form a monocyclic or polycyclic structure; m is an integer of 1 to 3; and p is an integer of 0 to 3.

3. The polarizer protection film according to claim 2, wherein monomer A is 8-methyl-8-methoxycarbonyltetracyclo-[4.4.0.1$^{2,5}$.1$^{7,10}$]-3-dodecene.

4. The polarizer protection film according to claim 2, wherein monomer B is bicyclo[2.2.1]hept-2-ene.

5. A polarizing film for a liquid crystal display in which a polarizer is laminated with the polarizer protection film according to claim 1 on at least one surface of the polarizer.

6. A liquid crystal display in which the polarizing film for a liquid crystal display according to claim 5 is laminated, with the interposition of a pressure-sensitive adhesive.

7. A polarizing film for a liquid crystal display in which a polarizer is laminated with the polarizer protection film according to claim 2 on at least one surface of the polarizer.

8. A liquid crystal display in which the polarizing film for a liquid crystal display according to claim 7 is laminated, with the interposition of a pressure-sensitive adhesive.

9. A polarizing film for a liquid crystal display in which a polarizer is laminated with the polarizer protection film according to claim 3 on at least one surface of the polarizer.

10. A liquid crystal display in which the polarizing film for a liquid crystal display according to claim is laminated, with the interposition of a pressure-sensitive adhesive.

11. A polarizing film for a liquid crystal display in which a polarizer is laminated with the polarizer protection film according to claim 4 on at least one surface of the polarizer.

12. A liquid crystal display in which the polarizing film for a liquid crystal display according to claim 11 is laminated, with the interposition of a pressure-sensitive adhesive.

* * * * *